US008297682B2

(12) United States Patent
Oirsouw et al.

(10) Patent No.: US 8,297,682 B2
(45) Date of Patent: Oct. 30, 2012

(54) ADJUSTMENT DEVICE FOR A MOVABLE BODY PART OF A MOTOR VEHICLE AND METHOD FOR ADJUSTING THE MOVABLE BODY PART

(75) Inventors: Harrie Oirsouw, Leonberg (DE); Andrew Fox, Victoria (AU)

(73) Assignee: Robert Bosch GmbH, Stuttgart (DE)

( * ) Notice: Subject to any disclaimer, the term of this patent is extended or adjusted under 35 U.S.C. 154(b) by 668 days.

(21) Appl. No.: 12/305,315

(22) PCT Filed: Aug. 1, 2007

(86) PCT No.: PCT/EP2007/057945

§ 371 (c)(1), (2), (4) Date: Sep. 24, 2009

(87) PCT Pub. No.: WO2008/022884

PCT Pub. Date: Feb. 28, 2008

(65) Prior Publication Data

US 2010/0037523 A1 Feb. 18, 2010

(30) Foreign Application Priority Data

Aug. 22, 2006 (DE) ......................... 10 2006 039 257

(51) Int. Cl.
*B60J 5/00* (2006.01)
*B60J 7/057* (2006.01)

(52) U.S. Cl. ................................. 296/146.4; 296/146.8

(58) Field of Classification Search ............... 296/146.4, 296/146.8

See application file for complete search history.

(56) References Cited

U.S. PATENT DOCUMENTS

| | | | | |
|---|---|---|---|---|
| 4,915,075 | A | 4/1990 | Brown | |
| 4,952,080 | A | 8/1990 | Boiucaner et al. | |
| 5,263,762 | A * | 11/1993 | Long et al. | 296/146.4 |
| 5,801,502 | A | 9/1998 | Monzen | |
| 6,404,157 | B1 * | 6/2002 | Simon | 318/445 |
| 2003/0177698 | A1 * | 9/2003 | Haag et al. | 49/342 |
| 2004/0090083 | A1 * | 5/2004 | Greuel et al. | 296/146.4 |
| 2006/0261631 | A1 * | 11/2006 | Watanabe et al. | 296/146.4 |
| 2007/0085373 | A1 * | 4/2007 | Watanabe | 296/146.8 |
| 2007/0176463 | A1 * | 8/2007 | Averitt | 296/146.4 |
| 2007/0262609 | A1 * | 11/2007 | King et al. | 296/146.8 |

FOREIGN PATENT DOCUMENTS

| | | |
|---|---|---|
| DE | 196 39 974 | 6/1997 |
| DE | 198 13 513 | 10/1998 |
| DE | 197 55 259 | 6/1999 |
| DE | 10 2005 019 846 | 1/2006 |
| EP | 0 625 625 | 11/1994 |
| EP | 1 652 708 | 5/2006 |
| JP | 2005-16252 | 1/2005 |
| JP | 2005-194767 | 1/2007 |

OTHER PUBLICATIONS

International Search Report, PCT/EP2007/057945, dated Nov. 26, 2007.

* cited by examiner

*Primary Examiner* — Jason S Morrow

(74) *Attorney, Agent, or Firm* — Kenyon & Kenyon LLP

(57) ABSTRACT

An adjustment device and a corresponding method for a movable body part of a vehicle, has an actuator for adjusting the movable body part and has a control device for activating the actuator in an operating state. The control device switches from the operating state to an idle state if no adjustment of the movable body part occurs within a defined period of time. A manual adjustment of the movable body part switches the control device back to the operating state from the idle state.

33 Claims, 5 Drawing Sheets

ADJUSTMENT DEVICE FOR A MOVABLE BODY PART OF A MOTOR VEHICLE AND METHOD FOR ADJUSTING THE MOVABLE BODY PART

CROSS-REFERENCE TO RELATED APPLICATION

This application is a national stage application of International Application No. PCT/EP2007/057945, filed Aug. 1, 2007, and claims priority to German Patent Application No. 10 2006 039 257.4, filed Aug. 22, 2006, which is incorporated by reference in its entirety.

FIELD OF THE INVENTION

The present invention relates to an adjustment device for a movable body part of a motor vehicle and a method for adjusting the movable body part.

BACKGROUND INFORMATION

Actuators intended to make actuation of movable body parts easier or to be used as a pinch protector or closing aid are increasingly used in motor vehicles. Thus, for example, an opening and closing control system for a vehicle sliding door, which is attached on one side to a vehicle body, is known from published German patent document DE 198 13 513. The sliding door is driven by a drive source, such as an electric motor, in accordance with an inclination of the sliding door if the motor vehicle is inclined vertically in relation to a longitudinal axis of the vehicle body, i.e., if the motor vehicle stops on an inclined street.

Published German patent document DE 10 2005 019 846 discloses a control device for improving the function of the opening and closing of a hatchback equipped with a gas-filled shock absorber, having a feeler for detecting the particular opening angle of the hatchback in relation to a vehicle body. An electronic control unit receives a detected angle from the feeler and outputs a pressure regulation control signal. The gas-filled shock absorber regulates the pressure of a cylinder in accordance with the control signal of the electronic control unit.

Furthermore, a two-part hatchback having an upper body part and a lower body part is known from published European patent document EP 1 652 708. With the aid of electric motors, the upper and lower body parts are controlled in such a way that they move synchronously with respect to one another. Published Japanese patent document JP 2005 194 767 discloses a movement sensor for checking the position of a sliding door, the sensor being situated and designed in such a way that a deep discharge of a vehicle battery is avoided. In addition, a movement sensor is disclosed in published Japanese patent document JP 2005 016 252, which transfers a signal to a control configuration to activate an actuator for the soft opening or closing of a vehicle door.

It is known from published German patent document DE 197 55 259 that microprocessors for controlling various actuators may be brought into an idle mode to reduce the power consumption in a motor vehicle. Wakeup and action signals may be applied to the microprocessor via an external switch assigned to a circuit configuration, to switch the processor from the idle mode to an operating mode. The circuit configuration has an idle mode circuit for generating a wakeup signal which triggers a wakeup interrupt, when the microprocessor is to be switched from the idle mode to the operating mode, and an operating mode circuit for generating action signals, the idle mode circuit being applied to a wakeable digital input and the operating mode circuit being applied to an analog input of the microprocessor and the at least one external switch being assigned to both circuits.

SUMMARY

An example adjustment device and method according to the present invention for adjusting a movable body part of a motor vehicle, having an actuator for adjusting the movable body part, and having a control device for activating the actuator in an operating state, the control device transitioning from the operating state to an idle state when no adjustment of the movable body part occurs within a defined period of time, may have the advantage in relation to the known related art in that, in addition to a further reduction of idle current consumption, an additional sensor element for detecting a movement of the movable body part, additional switching means, and/or a supplementary current measurement may be dispensed with in order to switch the control device back to the operating state from the idle state. This is now caused by a manual adjustment of the movable body part. It is thus advantageously sufficient that the control device may only utilize the already used detectors for position determination or, alternatively, may detect the position of the movable body part without a detector or sensor.

In an exemplary embodiment, the actuator is an electric motor which operates as a generator to generate the wakeup signal and thus exploits the back-EMF or counter-EMF (electromotive force), which acts on the windings as a result of the manual adjustment of the movable body part. A voltage and/or current pulse is thus generated by the manual adjustment of the movable body part and is used as the wakeup signal for the control device. In an alternative embodiment, the wakeup means are operationally linked to the movable body part, so that the manual adjustment of the movable body part causes a voltage and/or current change which is used as the wakeup signal for the control device. A potentiometer, in particular a slide potentiometer, and/or a Hall sensor integrated into the actuator is/are advantageously used as the wakeup means.

A further advantage results from the detection of the instantaneous position of the movable body part in the operating state of the control device by a position detector, the control device storing the instantaneous position of the movable body part detected by the position detector in a memory before its transition from the operating state to the idle state. This additionally allows an interruption of the power supply of the position detector by the control device to further reduce the idle current consumption. After the control device is switched back to the operating state, the stored position is then read out from the memory again, the control device activating the position detector again to detect the position of the movable body part. It is further advantageous for reasons of cost and to save installation space if the position detector is the Hall sensor integrated into the actuator. This may advantageously also assume the function of the wakeup means, it then however may be necessary to avoid an interruption of the power supply for the idle current reduction. Alternatively or additionally, the wakeup means operationally linked to the movable part may be used as the position detector. As with the Hall sensor, however, no measures may be taken in this case to interrupt the power supply of the wakeup means. Furthermore, it is possible to dispense completely with a position detector, in that the waviness of a commutation signal activating a commutation device of the actuator implemented as the electric motor is analyzed in the scope of a ripple count method by the control device to detect the position of the movable body part. In this case, the control device also stores the detected instantaneous position of the movable body part in the memory before its transition from the operating state to the idle state.

During the adjustment of the movable body part in the idle state or in the wakeup phase of the control device, a deviation may occur between the stored and actual positions of the movable body part. The control device therefore advantageously has correction means for correcting the position of the adjusted body part which has changed during the wakeup phase from the idle state to the operating state, the wakeup phase of the control device including the time span from the manual adjustment of the movable body part until the readout of the stored position from the memory. The correction means may, for example, be designed in the form of an algorithm or a lookup table stored in the control device, the correction value resulting as a function of the ascertained back-EMF of the actuator. In this context, a detected steepness of the back-EMF change, which represents a measure of the force action on the movable body part during the manual adjustment, may be used as a further correction value. It is also conceivable to ascertain a mean number of the clock pulses of the position detector during the wakeup phase and store it as a correction value in the control device.

To always ensure the most exact possible determination of the instantaneous position of the movable body part, it is also provided that the control device performs a calibration procedure at defined points in time in the particular final position of the movable body part, i.e., in the completely open or closed state. The frequency of the performed calibration procedures is a function of the required precision of the wakeup and adjustment procedures.

In particular, at higher ambient temperatures, a leakage current may occur via a diagnostic branch and/or a suppression circuit of the actuator, which results in an unintentional wakeup of the control device. To prevent this, electrical means are provided, which, when designed as at least one switching means, decouple the diagnostic branch and/or the suppression circuit of the actuator from an electrical ground potential. Alternatively, the electrical means may include at least one resistor network connected to the diagnostic branch and/or the suppression circuit of the actuator, which is dimensioned in such a way that a voltage drop caused by the leakage current does not exceed a defined limiting value for the wakeup of the control device.

The adjustment device according to the present invention and/or the corresponding method are particularly suitable for movable body parts in the form of a hatchback, a vehicle door, a convertible top, an engine hood, or a fuel tank cap of the motor vehicle.

DETAILED DESCRIPTION OF EXAMPLE EMBODIMENTS

Figure 1:
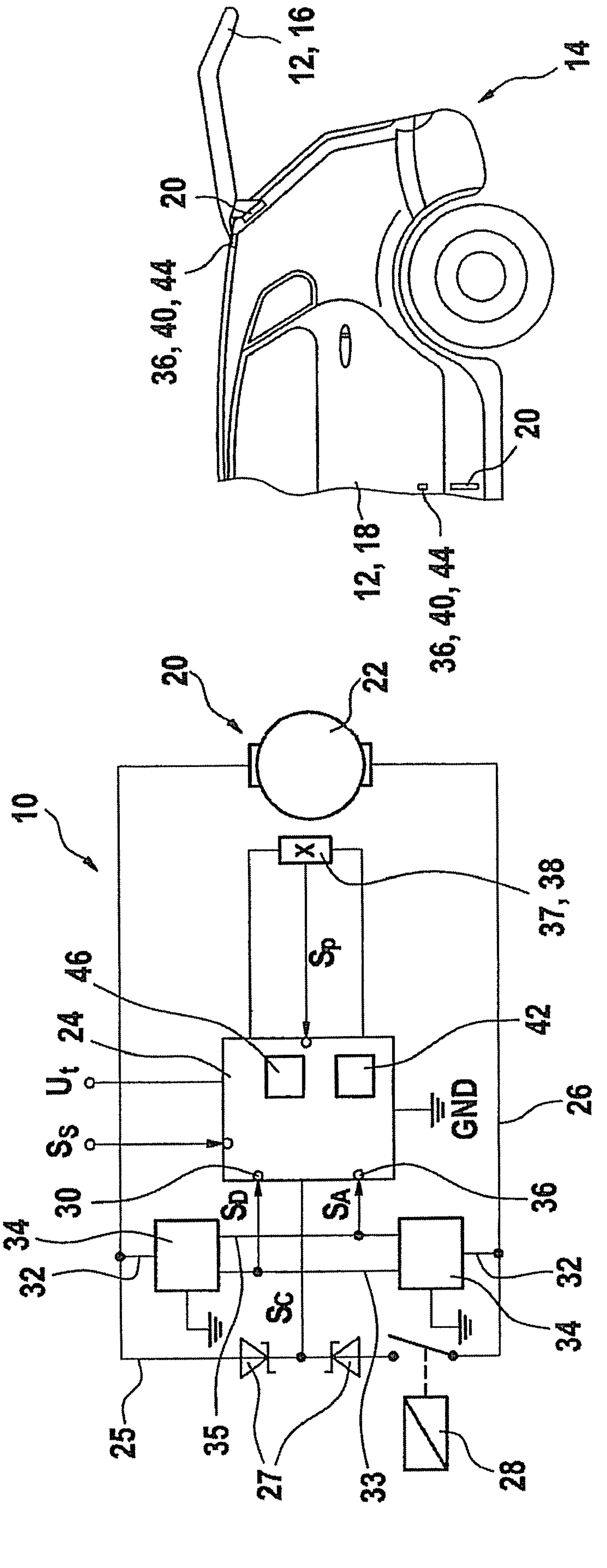
FIG. 1 shows a schematic illustration of an example adjustment device for a movable body part of a motor vehicle according to the present invention.

The present invention will now be described with reference to the figures. Unless otherwise indicated, identical reference numerals in the figures indicate identical components having an identical mode of operation.

FIG. 1 shows a schematic illustration of an adjustment device 10 according to the present invention for a movable body part 12 of a motor vehicle 14 based on the example of a hatchback 16 and a rear side door 18. Reference numeral 20 identifies an actuator for adjusting movable body part 12, which may be fastened to the body of motor vehicle 14 or to movable body part 12. Actuator 20 is implemented in the illustrated example as an electric motor 22. However, other actuators 20 suitable for the present invention, such as gas-filled shock absorbers or the like, may also be used. In addition to shown hatchback 16 and rear side door 18, other doors of motor vehicle 14, an engine hood, a convertible top, a fuel tank cap, or the like come into consideration as movable body parts 12.

Electric motor 22 is activated via a control device 24, such as a microprocessor, an ASIC, or a corresponding discrete or integrated circuit. For this purpose, a corresponding control signal Ss is transmitted to control device 24, which is connected to a supply voltage $U_+$ and an electrical ground potential GND, by a signal generator (not shown), which is preferably located outside adjustment device 10. The signal generator may, for example, be designed as a radio receiver of a radio remote control for motor vehicle 14 or as switching or sampling means situated inside motor vehicle 14. However, it is also conceivable that the radio receiver is already integrated into adjustment device 10 or even control device 24.

For the sake of clarity, the illustration of a ground connection for electric motor 22 was dispensed with in FIG. 1. This ground connection may be implemented, for example, using a half bridge located between control device 24 and electric motor 22. Electric motor 22 may be activated in two different directions to open or close movable body part 12 via two activation branches 25 and 26, in each of which a Zener diode 27 is situated for voltage stabilization. The movement direction is switched by a polarity reversal using a relay 28, which is situated in activation branch 26. It is also possible, without restriction of the present invention, for activation branch 25 to have relay 28, or for a corresponding relay to be located in both activation branches 25 and 26.

Control device 24 has a diagnostic interface 30 for diagnosing electric motor 22 via corresponding diagnostic branches 32 during the operating state. It is possible—as shown in FIG. 1—for either all terminals of electric motor 22 or activation branches 25, 26 to have a diagnostic branch 32, or for only a subset of the terminals to be monitored. Diagnostic branches 32 are connected to diagnostic interface 30 of control device 24 via circuits 34, which are explained in greater detail in connection with FIG. 5, and corresponding diagnostic lines 33. Alternatively, a separate diagnostic interface 30 may be provided in control device 24 for each diagnostic branch 32. Diagnostic branches 32 are used in the idle state of control device 24, but also, as shown in connection with FIGS. 2 through 5, for waking up control device 24 using a wakeup signal $S_A$. For this purpose, they are connected via circuits 34 and corresponding wakeup lines 35 to a wakeup interface 36 of control device 24, which is active in the idle state and inactive in the operating state. As for diagnostic interface 30, it is also true for wakeup interface 36 that it may be provided alternatively for each activation branch 25, 26 or terminal of electric motor 22. If both activation branches 25 and 26 are connected via circuit 34 to wakeup interface 36, this ensures waking of control device 24 by a manual adjustment of movable body part 12 in both directions. Furthermore, it is possible for diagnostic interface 30 and wakeup interface 36 to be combined in a joint interface (not shown in FIG. 1). In this case, the joint interface operates as the wakeup interface in the idle state of control device 24 and as the diagnostic interface in the operating state of control device 24.

A position detector 37, which is implemented here as a Hall sensor 38 and is integrated into electric motor 22, is used for the position detection of movable body part 12. The location of the rotor and thus also of movable body part 12 may be detected in a simple and known way via a magnetic disk (not shown), which is mounted in a rotationally fixed manner on a rotor shaft of electric motor 22. Other position detectors, such as AMR sensors (anisotropic magnetoresistive sensors) or the like may also be used. It is additionally possible for a potentiometer 40, which is operationally linked to the rotor shaft of electric motor 22 or movable body part 12 itself, to be used for the position detection of movable body part 12 instead of the Hall sensor 38. In the case of an operational link to movable body part 12, potentiometer 40 may be implemented in particular as a slide potentiometer. Instead of potentiometer 40, a linear sensor or the like may also be used. A further alternative results from a detection of the position of the movable body part without a detector or sensor, in that the residual waviness of a commutation signal $S_C$ which activates the commutation device of electric motor 22 is analyzed in the scope of a ripple count method by control device 24. However, the Hall sensor 38, whose position signal $S_P$ is transmitted to control device 24 for storage of the instantaneous position of movable body part 12 in a memory 42, may to be assumed as present in the exemplary embodiments hereinafter without restriction of the present invention. A corresponding procedure may also be applied to the above-mentioned alternatives to Hall sensor 38.

An example method according to the present invention for adjusting movable body part 12 will be described with reference to the flow charts in FIGS. 2 and 3. Reference numeral 100 identifies the operating state of adjustment device 10, in which both a manual adjustment and also an automatic adjustment of movable body part 12 are possible via the remote control or the switching or sampling means situated inside motor vehicle 14. A manual adjustment is to be understood as an adjustment by hand and an automatic adjustment is to be understood as an adjustment using actuator 20, for example. In a first step 102, the remote control or the switching or sampling means is actuated, movable body part 12 being adjusted in the direction of a closed or open state as a function of control signal $S_S$. Actuator 20 may be monitored using a diagnostic signal $S_D$ via diagnostic branches 32 and diagnostic interface 30 of control device 24. In addition, control device 24 supplied with power detects the position of movable body part 12 with the aid of position detector 37 or without a detector or sensor, as described above. In a subsequent step 104, movable body part 12 is stopped in an arbitrary position and the instantaneous position detected using position detector 37 is stored as position signal $S_P$ in memory 42 of control device 24. However, storing position signal $S_P$ immediately after each stoppage of movable body part 12 is not fundamentally necessary.

If no further manual or automatic adjustment of movable body part 12 occurs within a defined period of time, for example 30 seconds after the last adjustment, adjustment device 10 and control device 24 is switched to an idle, sleep, or energy-saving state in step 106 and the instantaneous detected position of movable body part 12 is stored as position signal Sp in memory 42 of control device 24. Diagnostic interface 30 is deactivated and wakeup interface 36 is activated. Because the power supply for control device 24, position detector 37, and electric motor 22 is thus greatly reduced or entirely interrupted, a very low idle current results. This is important in today's motor vehicles in particular, because the increasing number of electrical consumers requires a sophisticated idle current concept to minimize or avoid a strain on the motor vehicle battery in the shutdown state of motor vehicle 14 and the associated danger of a deep discharge. If a bus activation of actuator 20 via a CAN or LIN bus of motor vehicle 14 exists, for example, it is alternatively possible according to step 108, indicated by dashed lines, to activate the idle state of adjustment device 10 using the data bus.

Figure 4:
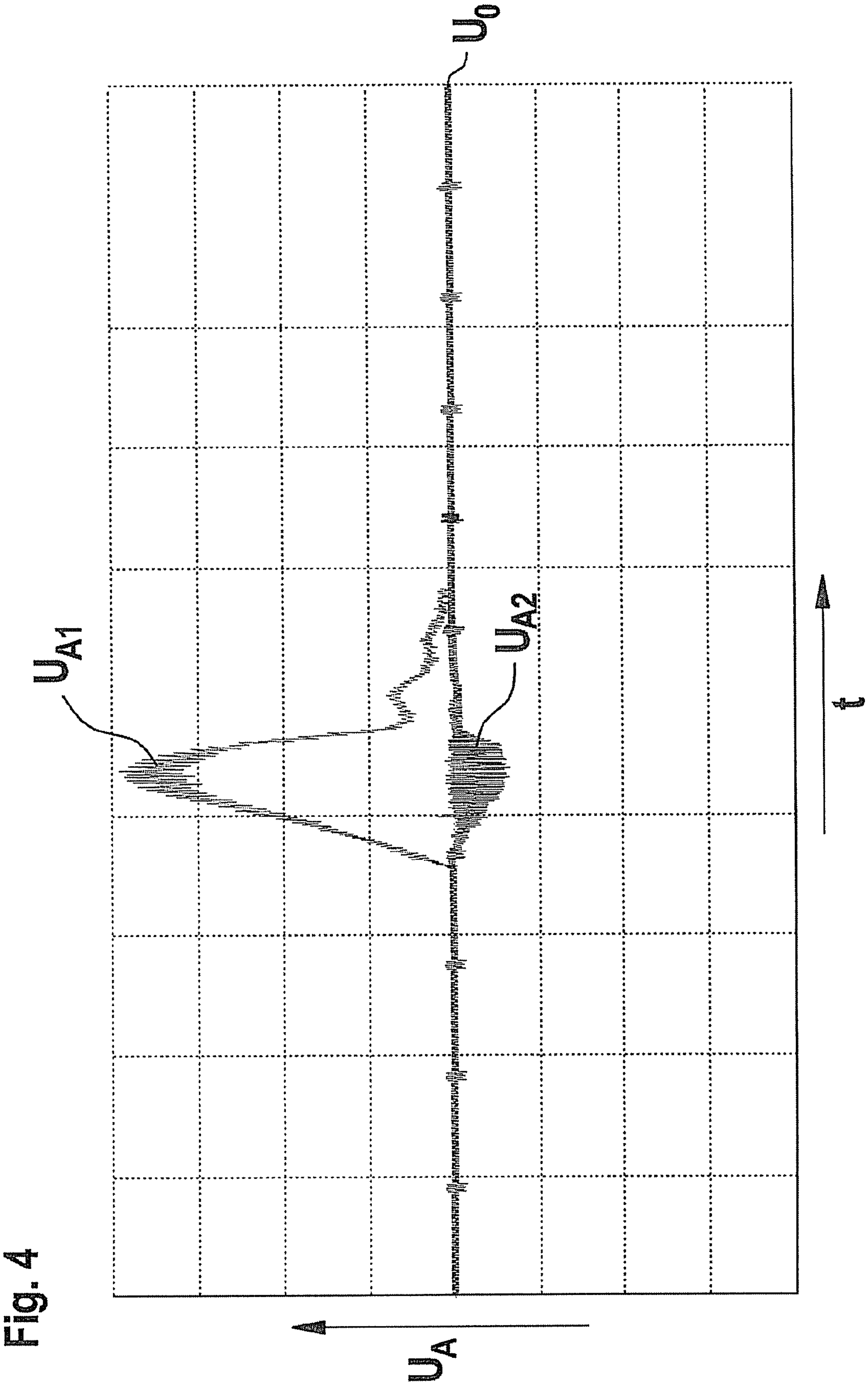
FIG. 4 shows a diagram of a voltage pulse measured by manual adjustment of a movable body part at an actuator as a function of time.

A manual adjustment of movable body part 12 in step 110 has the result that electric motor 22 operates as a generator, which generates a voltage and/or current pulse as a result of the resulting back-EMF or counter-EMF. FIG. 4 shows an example of a voltage pulse $U_A$ as a function of time t for a manual adjustment of movable body part 12 in the direction of a more strongly open (voltage pulse $U_{A1}$) and a more strongly closed state (voltage pulse $U_{A2}$), the positive or negative orientation of voltage pulse $U_A$ originating from a base value $U_O$ being a function of the rotational direction of electric motor 22. Voltage pulse $U_A$ acts via diagnostic branches 32 of particular activation branches 25, 26 for opening or closing movable body part 12, circuits 34, and wakeup lines 35 as a wakeup signal $S_A$ on wakeup interfaces 36 of control device 24 (shown in FIG. 1). Adjustment device 10 is then switched back to the operating state from its idle state in step 112. Alternatively, it is also possible for potentiometer 40 operating as a position detector 37 to assume the task of wakeup means 44. The adjustment of movable body part 12 causes a change of the ohmic resistance of potentiometer 40 and accordingly a voltage and/or current change, which is used as a wakeup signal $S_A$ for control device 24 when a specific threshold value is exceeded. The precise description of the circuit topology in connection with potentiometer 40 may be dispensed with here, because a use of potentiometer 40 within a correspondingly designed voltage divider is known, for example. It is also possible in this case to use wakeup interface 36 as an input for wakeup signal $S_A$. Alternatively as already explained above—a joint interface of control device 24 may also be used for the diagnosis and the wakeup.

The wakeup phase and the correction of the stored position of movable body part 12 according to step 110 will now be described in detail with reference to FIG. 3. The manual adjustment of movable body part 12 in step 110*a* generates the above-mentioned voltage and/or current pulse according to FIG. 4 in electric motor 22 in step 110*b*. This pulse acts as wakeup signal $S_A$ via diagnostic branches 32 on wakeup interface 36 of control device 24. It is also conceivable with reference to the above description that instead of actuator 20, potentiometer 40 used as wakeup means 44 or Hall sensor 38 generates wakeup signal $S_A$.

In step 110*c*, control device 24 is switched from its idle state to the operating state and supplied with energy as a result of wakeup signal $S_A$. It then reads out the position of movable body part 12 stored in its memory 42 before the switch to the idle state in step 110*d*. The time span passing during steps 110*a* through 110*d* thus defines the wakeup phase of control device 24.

In step 110*e*, control device 24 causes an energy supply of position detector 37, which is implemented as Hall sensor 38 or potentiometer 40, for renewed detection of the instantaneous position of movable body part 12 in step 110*f*. In contrast, if potentiometer 40 additionally operates as wakeup means 44, a renewed application of supply voltage $U_+$ is not necessary, because it must be applied permanently in any case to generate wakeup signal $S_A$. In this case, step 110*e* may be dispensed with. This is correspondingly true if Hall sensor 38 is also used to generate wakeup signal $S_A$ in addition to its function as position detector 37.

After the instantaneous position is detected in step 110*f* using position detector 37, the stored position is updated in step 110*g* by control device 24 using the instantaneous position. It is thus ensured that adjustment device 10 operates using the correct data. Nonetheless, because of the temporary adjustment of movable body part 12 during the idle state and the wakeup phase of control device 24, the occurrence of an imprecise position signal $S_P$ is possible, because the actual position of movable part 12 and the position stored in memory 42 may deviate from one another. Control device 24 therefore has correction means 46 which allows for a correction of the position of adjusted body part 12 which has changed during the wakeup phase from the idle state to the operating state. Correction means 46 may be designed, for example, in the form of an algorithm or a lookup table stored in control device 24, a correction value determined as a function of the ascertained back-EMF of electric motor 22. In this context, the detected steepness of the back-EMF change which represents a measure of the force action on movable body part 12 during the manual adjustment may be used as a further correction value. It is also conceivable for a mean number of the clock pulses of position detector 37 to be ascertained during the wakeup phase and stored as the correction value in memory 42 of control device 24 to correct originally stored position signal $S_P$ as a function of the adjustment direction of movable body part 12. Detection of the adjustment direction—as shown in FIG. 4—is possible on the basis of the voltage and/or current pulse generated by electric motor 22.

Figure 2:
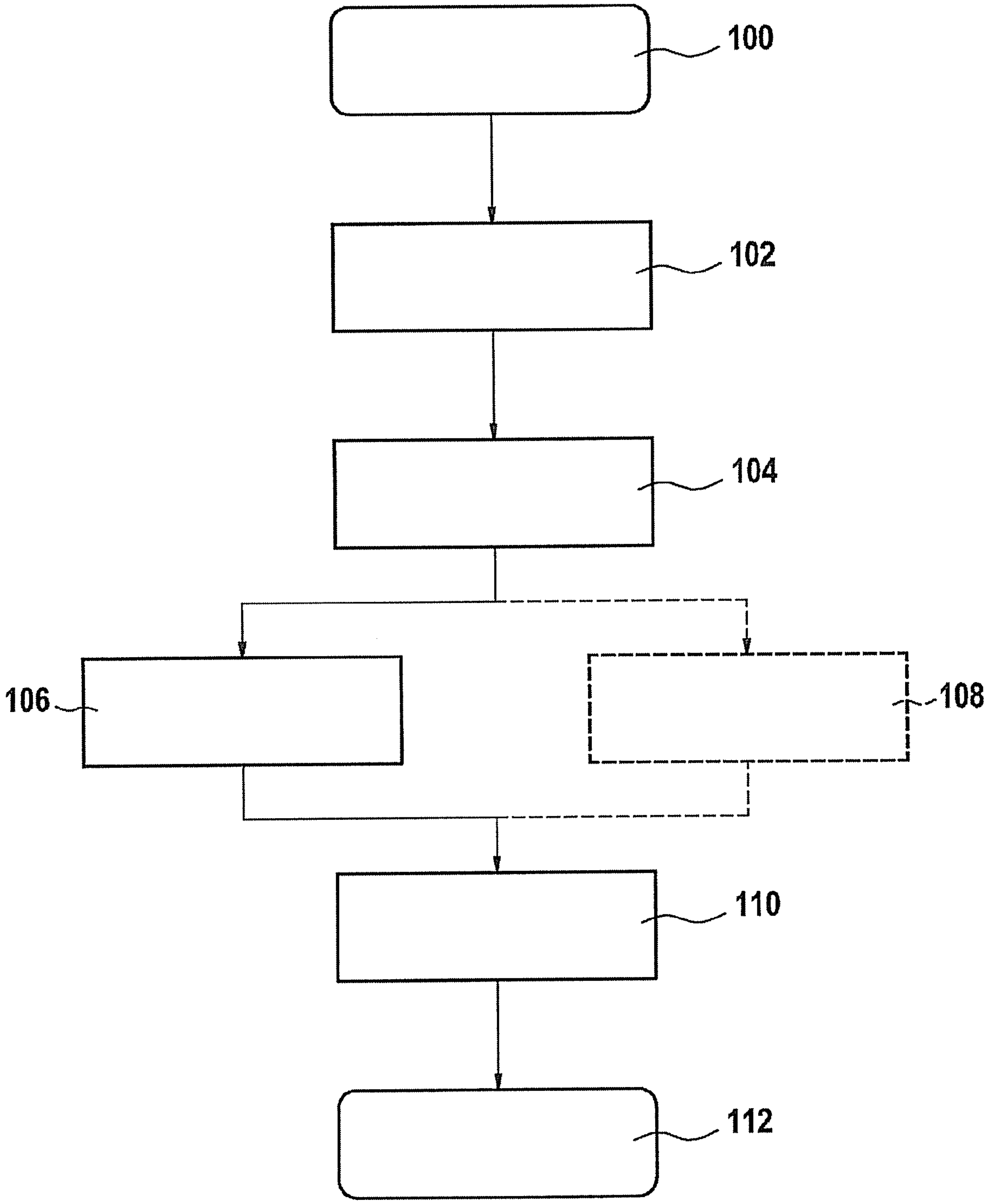
FIG. 2 shows a first flow chart of an example method for adjusting a movable body part according to the present invention.
Figure 3:
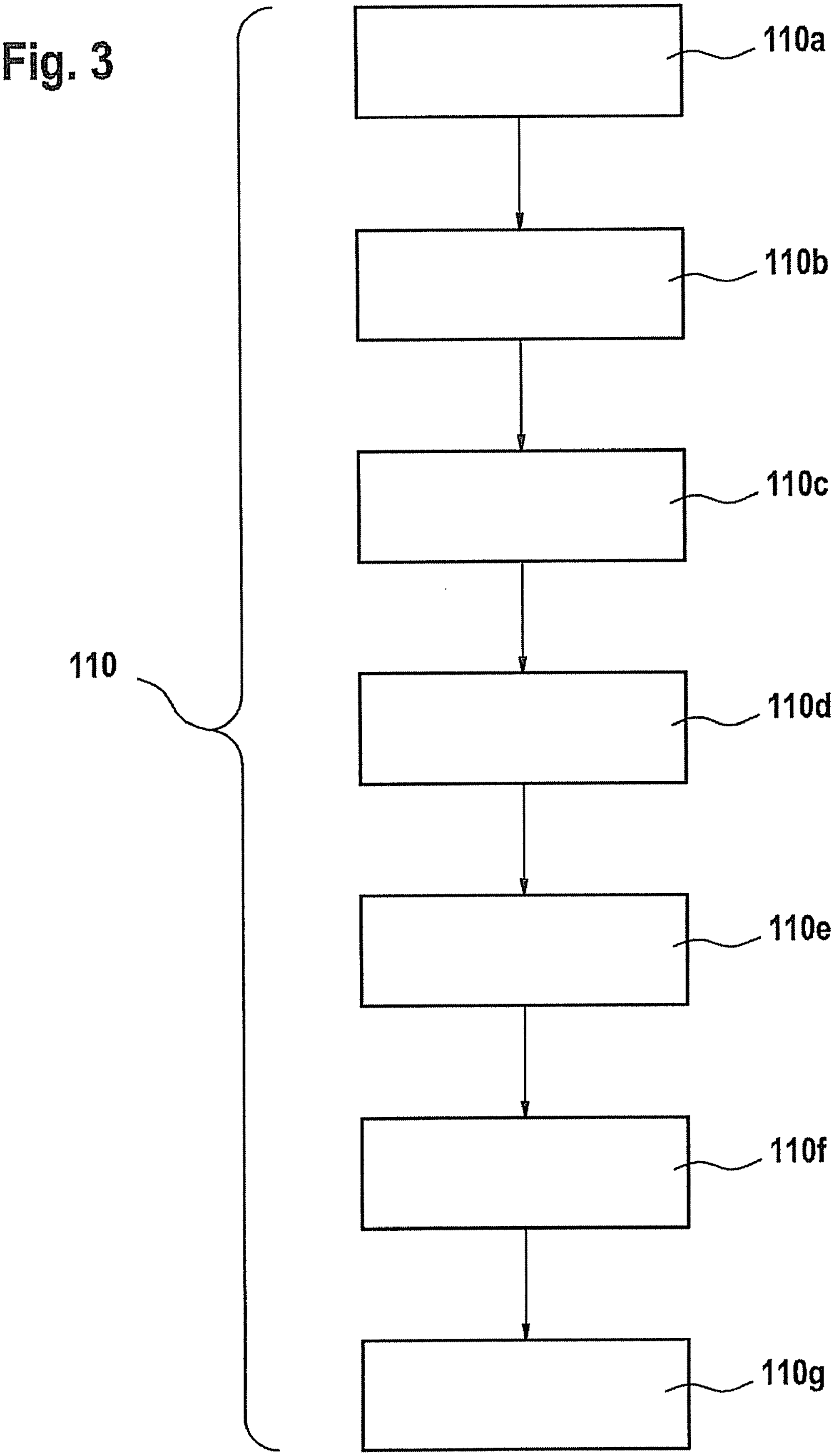
FIG. 3 shows a second flow chart of a method for adjusting the movable body part according to the present invention.

After the possible correction of the position readout from memory 42, step 110 is ended and the method moves to step 112 as shown in FIG. 2. Adjustment device 10 has again assumed its normal operating state and allows a manual or automatic adjustment of movable body part 12. Diagnostic interface 30 is in an activated state and wakeup interface 36 is in a deactivated state. In addition, control device 24 may perform a calibration procedure at defined points in time in the particular final position of the movable body part, i.e., in the completely open or closed state, so that these absolute positions form a reference (0% or 100%) for the positions measured without detectors or using position detector 37 during the adjustment. The frequency of the calibration procedures is a function, inter alia, of the particular application, i.e., which type of movable body part 12 is adjusted, and/or the required precision of the adjustment and wakeup procedures. Accordingly, the higher the requirements for the precision, the more often a calibration procedure must be performed. Furthermore, it is expedient to perform the calibration procedure after every reset of control device 24 or adjustment device 10, for example, as a result of a battery voltage interruption or reduction. An early recognition of the battery voltage reduction may be performed by monitoring a voltage regulator or the like (not shown), a corresponding output signal triggering the calibration procedure. In connection with a performed recalibration, the functionality of adjustment device 10 may be restricted in such a way that automatic adjustment of movable body part 12 via actuator 20 is not possible immediately after the recalibration. However, an exception is possible in connection with a pinch protection sensor system (not shown) for movable body part 12, which allows automatic running in spite of a lack of calibration to increase safety. Furthermore, it is conceivable to define a maximum number of allowed adjustment procedures, a calibration procedure being required when this number is reached. Thus, for example, it may be provided that movable body part 12 must automatically be calibrated after every hundredth or two-hundredth adjustment procedure upon the next complete opening and/or closing. A calibration may also be performed after every complete manual opening or closing, an appropriately attached sensor signaling the particular final position and relaying it to control device 12.

Figure 5:
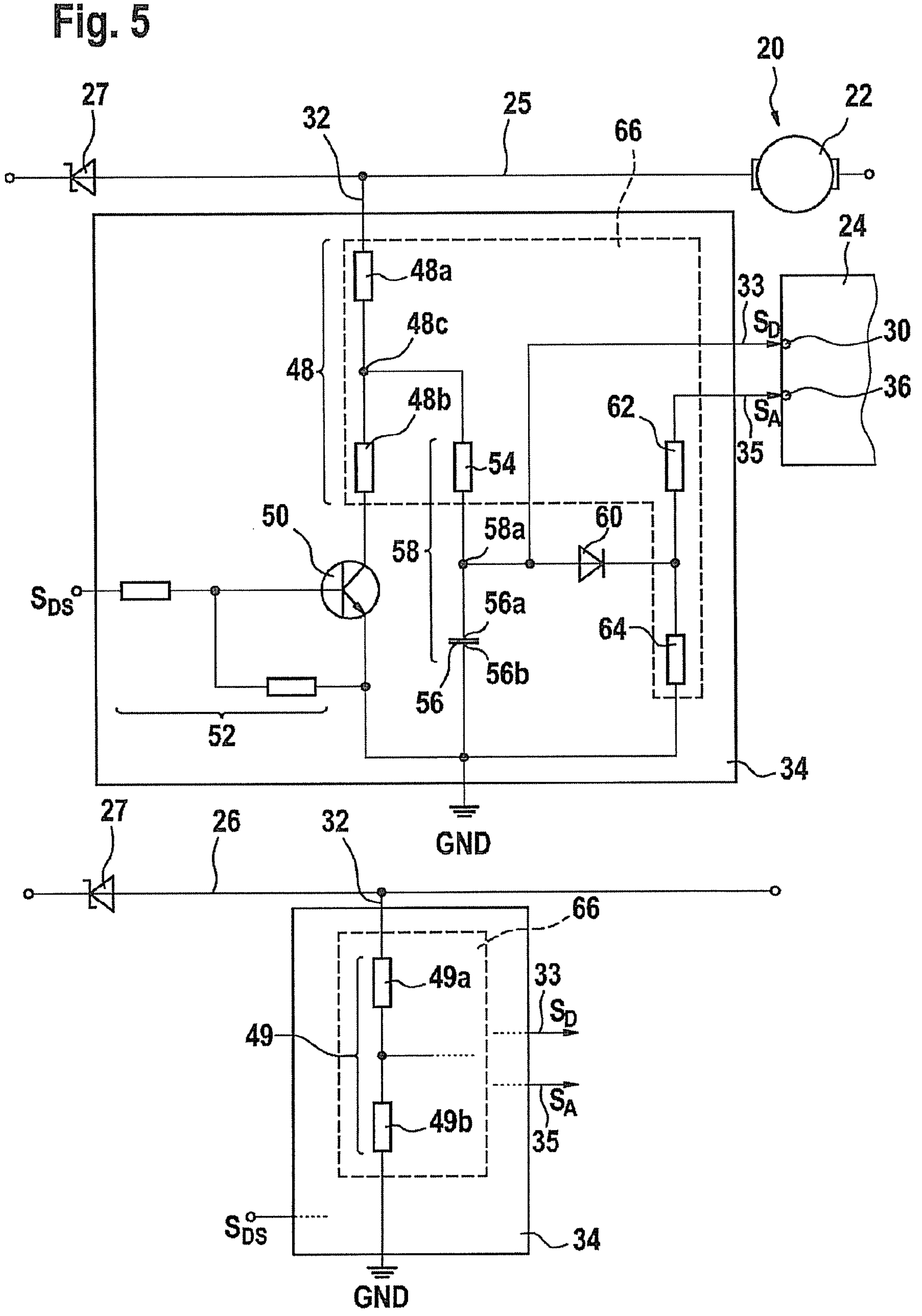
FIG. 5 shows a block diagram of an example diagnostic branch of an actuator for delivering a wakeup signal according to the present invention.

A detailed view of one of the circuits 34, shown in FIG. 1, for diagnosis of electric motor 22 or for wakeup of control device 24 via activation branch 25, is shown in FIG. 5. One circuit 34 is advantageously connected in each case to activation branch 25 and 26 to allow a wakeup in both adjustment directions of movable body part 12. Each circuit 34 is further connected via diagnostic line 33 to diagnostic interface 30 and via wakeup line 35 to wakeup interface 36 of control device 24 for transmitting diagnostic signal $S_D$ in the operating state or wakeup signal $S_A$ in the idle state.

Circuits 34 have a first voltage divider 48 or 49 which is wired on the one hand to activation branch 25 or 26 between the anodes of Zener diode 27 and a terminal of electric motor 22 operating as actuator 20, and is connectable on the other hand via switching means 50 to electrical ground potential GND. For this purpose, switching means 50, which are designed as a bipolar transistor, field effect transistor, relay, or the like, for example, are activatable or deactivatable using a diagnostic switching signal $S_{DS}$ via a second voltage divider 52. Diagnostic switching signal $S_{DS}$ may be a DC voltage of approximately 5 V, for example, and may be generated by a control device situated outside adjustment device 10 or by control device 24 itself.

For better clarity, only parts of the circuit 34 connected to activation branch 26 are shown in FIG. 5. Its construction essentially corresponds to that of the circuit 34 connected to activation branch 25. For the case that a wakeup of control device 24 is only necessary in one movement direction or only one of activation branches 25, 26 is to be monitored, circuits 34 may certainly deviate from one another, in that wakeup line 35 or diagnostic line 33 and the components connected thereto are dispensed with. The mode of operation and the construction of circuits 34 will be explained hereinafter with reference to the circuit 34 connected to activation branch 25. A central tap 48*c* for an RC element 58 including a resistor 54 and a capacitor 56 is provided between both resistors 48*a* and 48*b* of first voltage divider 48, a first terminal 56*a* of capacitor 56 being connected via a central tap 58*a* of RC element 58 to the anode of a diode 60 and a second terminal 56*b* of capacitor 56 being connected to electrical ground potential GND. Furthermore, there is a connection of central tap 58*a* via diagnostic line 33 to diagnostic input 30 of control device 24 for transmitting diagnostic signal $S_D$ in the operating state of control device 24 with activated and low-resistance switching means 50. Finally, the cathode of diode 60 is connected via a resistor 62 and wakeup line 35 to wakeup interface 36 of control device 24 for transmitting wakeup signal $S_A$ in the idle state, while being connected to electrical ground potential GND via a further resistor 64.

In the operating state of control device 24, switching means 50 is activated using diagnostic switching signal $S_{DS}$, so that second resistor 48*b* of first voltage divider 48 has a connection to electrical ground potential GND. In this case, a unique diagnosis of electric motor 22 by control device 24 is possible as a result of the current flow via first resistor 48_a_ of first voltage divider 48, resistor 54 of RC element 58, and diagnostic line 33.

In the idle state of control device 24, its diagnostic interface 30 is deactivated, so that a current flow may solely act on wakeup interface 36. As a result of an increased ambient temperature (e.g., 80° C.), in the event of a ground connection of first voltage divider 48, however, a leakage current may occur through Zener diode 27, which results in an unintentional wakeup of control device 24 via wakeup interface 36. A corresponding leakage current may also be caused by a suppression circuit (not shown), which is connected to electric motor 22. To avoid leakage currents of this type, switching means 50 are deactivated by setting diagnostic signal $S_{DS}$ to zero to decouple first voltage divider 48 from electrical ground potential GND. If capacitor 56 of RC element 58 is charged, there is also no connection to electrical ground potential GND via the capacitor 56. Because control device 24 is in the idle mode, there is no diagnosis of electric motor 22 via diagnostic interface 30.

The following example assumes a leakage current of approximately 200 μA at 80° C., which is typical for a hatchback application. This corresponds to a maximum idle current for applications in motor vehicles and to a temperature range from −40° C. to +85° C., the setting being performed via first voltage divider 49 of the circuit 34 connected to activation branch 26. If one assumes that this first voltage divider 49 has two resistors 49_a_ and 49_b_ having values of 6.8 kΩ and 1 kΩ, respectively, the 1 kΩ resistor being connectable to electrical ground potential GND, a voltage which drops in the amount of approximately 1.56 V via electric motor 22 results because of the leakage current of 200 μA and also drops via circuit 34 connected to activation branch 25. Although circuits 34 are predominately constructed identically in this example, the circuits 34 may have differently dimensioned components.

For example, if one assumes that first resistor 48_a_ and second resistor 48_b_ of first voltage divider 48 of the circuit 34 connected to activation branch 25 have values of 47 kΩ and 27 kΩ, respectively, and that second resistor 48_b_ of first voltage divider 48 has no connection to electrical ground potential GND because of deactivated switching means 50 and resistor 54 of RC element 58, which is dimensioned at 27 kΩ, and because of charged capacitor 56, then a voltage of approximately 0.9 V is applied via resistor 64, which is dimensioned at 1 MΩ, under the consideration that a transmission voltage of 0.6 V drops via diode 60. Because resistor 62, which is connected via wakeup line 35 to wakeup interface 36 of control device 24, has a negligible value of 1.2 kΩ in relation to resistor 64, a voltage of nearly 0.9 V is accordingly also applied to wakeup interface 36.

Wakeup interface 36 is designed in such a way that a voltage of at least 1 V may be required to switch control device 24 from its idle state to the operating state. If movable body part 12 is manually adjusted, this acts on an electric motor 22, which operates as a generator as a result of the back-EMF or counter-EMF and generates a voltage pulse $U_A$ according to FIG. 4. As a result of this voltage pulse $U_A$, the voltage applied to wakeup interface 36 increases from approximately 0.9 V to greater than 1 V, so that voltage pulse $U_A$ wakes up control device 24 in the manner of a wakeup signal $S_A$. A corresponding behavior is also possible if diagnostic interface 30 and wakeup interface 36 are unified in a joint interface. In this case, it is only necessary to switch the function of the joint interface by control device 24 as a function of its state.

Resistors 48_a_, 48_b_, 54, 62, and 64 together form a resistor network 66 which is connected to diagnostic branch 32 of electric motor 22 and is dimensioned in such a way that the voltage drop caused by the leakage current at wakeup interface 36 does not exceed the defined limiting value of 1 V for waking up control device 24. Resistors 49_a_ and 49_b_ as well as further resistors (not shown) of circuit 34 connected to activation branch 26 may also be components of resistor network 66. This is expedient because the voltage which drops via electric motor 22 as a result of the leakage current is settable via resistors 49_a_ and 49_b_, and which forms an essential offset for exceeding or falling below the defined limiting value (in this case 1 V) for waking up control device 24 as a result of the manual adjustment of movable body part 12. The corresponding resistors of both circuits 34 may accordingly form a resistor network 66 for the fine setting of the wakeup procedure. The resistance values cited here are not to be understood as restrictive, but only as exemplary. One skilled in the art is capable of adapting the resistors to the particular requirements, for example, as a function of the limiting value and/or the leakage current.

Finally, it is to be noted that the exemplary embodiments shown are not restricted to FIGS. 1 through 5 or to the cited values for the resistors or the voltages. The use of Zener diodes 27 in activation branches 25, 26 is also not to be understood as a restriction of the present invention. It is also conceivable for circuits 34 and resistance networks 66 to be dimensioned differently for each activation branch. FIG. 4, inter alia, shows that this is a completely expedient measure, because the back-EMF or counter-EMF may be strongly dependent on the adjustment direction.

What is claimed is:

1. An adjustment device for a movable body part of a motor vehicle, comprising:

an actuator adjusting the movable body part; and a control device activating the actuator during an operating state, the control device transitioning from the operating state to an idle state if no adjustment of the movable body part occurs within a defined period of time, wherein a manual adjustment of the movable body part switches the control device from the idle state back to the operating state, wherein the control device includes a correction system for correcting the position of the adjustable body part when the position has changed during a wakeup phase from the idle state to the operating state.

2. The adjustment device as recited in claim 1, wherein the manual adjustment of the movable body part generates at least one of a voltage and a current pulse in the actuator, the at least one of the voltage and the current pulse being used as a wakeup signal for the control device.

3. The adjustment device as recited in claim 1, further comprising:

a wakeup system operationally linked to the movable body part, for causing at least one of a voltage change and a current change, the at least one of the voltage change and the current change being used as a wakeup signal for the control device as a result of the manual adjustment of the movable body part.

4. The adjustment device as recited in claim 3 wherein the wakeup system includes at least one of a slide potentiometer and a Hall sensor integrated into the actuator.

5. The adjustment device as recited in claim 1, further comprising: a position detector detecting an instantaneous position of the movable body part during the operating state of the control device.

6. The adjustment device as recited in claim 1, wherein an instantaneous position of the movable body part is detected without a detector in that a waviness of a commutation signal activating a commutation device of the actuator is analyzed in the scope of a ripple count method by the control device to detect the position of the movable body part.

7. The adjustment device as recited in claim 5, wherein the control device stores the detected instantaneous position in a memory before the transition from the operating state to the idle state and reads out the detected instantaneous position from the memory after being switched back to the operating state.

8. The adjustment device as recited in claim 7, wherein the control device reactivates the position detector to detect the position of the movable body part after the control device is switched back to the operating state.

9. The adjustment device as recited in claim 1, wherein the wakeup phase includes a time span from the manual adjustment of the movable body part until a readout of a stored position from a memory.

10. The adjustment device as recited in claim 1, wherein the control device performs a calibration procedure to calibrate a stored final position of the movable body part, the calibration procedure being performed at defined points in time.

11. The adjustment device as recited in claim 10, wherein a frequency of the calibration procedures is a function of a required precision of wakeup and adjustment procedures used in the adjustment device.

12. The adjustment device as recited in claim 1, further comprising:

an electrical system for preventing a leakage current from causing an undesired wakeup of the control device.

13. The adjustment device as recited in claim 12, wherein the electrical system includes at least one switching system for decoupling a diagnostic branch of the actuator from an electrical ground potential during the idle state of the control device.

14. The adjustment device as recited in claim 12, wherein the electrical system includes at least one resistor network connected to the diagnostic branch of the actuator, the at least one resistor network dimensioned in such a way that a voltage drop caused by a leakage current does not exceed a defined limiting value for the wakeup of the control device.

15. The adjustment device as recited in claim 1, wherein the movable body part of the motor vehicle is one of a hatchback, a vehicle door, a convertible top, an engine hood and a fuel tank cap.

16. The adjustment device as recited in claim 1, wherein the actuator is an electric motor, which operates as a generator to generate the wakeup signal.

17. The adjustment device as recited in claim 5, wherein the position detector is one of a Hall sensor integrated into the actuator and a wakeup system operationally linked to the movable body part for causing at least one of a voltage change and a current change, the at least one of the voltage change and the current change being used as a wakeup signal for the control device as a result of the manual adjustment of the movable body part.

18. A motor vehicle including an adjustment device, the adjustment device comprising:

an actuator adjusting a movable body part; and a control device activating the actuator during an operating state, the control device transitioning from the operating state to an idle state if no adjustment of the movable body part occurs within a defined period of time, wherein a manual adjustment of the movable body part switches the control device from the idle state back to the operating state, wherein the control device includes a correction system for correcting the position of the adjustable body part when the position has changed during a wakeup phase from the idle state to the operating state.

19. A method for adjusting a movable body part of a motor vehicle using an actuator, comprising:

activating the actuator using a control device during an operating state;

switching the control device from the operating state to an idle state if no adjustment of the movable body part occurs within a defined period of time;

switching the control device from the idle state back to the operating state in response to a manual adjustment of the movable body part, and correcting the position of the adjustable body part, using a correction system of the control device, when the position has changed during a wakeup phase of the control device from the idle state to the operating state.

20. The method as recited in claim 19, further comprising: responsive to the manual adjustment of the movable body part, generating at least one of a voltage and a current pulse, in the actuator, the at least one of the voltage and the current pulse being used as a wakeup signal for the control device.

21. The method as recited in claim 20, wherein the at least one of the voltage and the current pulse is generated by a wakeup system for generating the wakeup signal in response to the manual adjustment of the movable body part.

22. The method as recited in claim 19, further comprising: detecting an instantaneous position of the movable body part during the operating state of the control device using a position detector; storing the detected instantaneous position in a memory of the control device before the transition of the control device from the operating state to the idle state; and reading the stored detected instantaneous position out from the memory after the control device is switched back to the operating state.

23. The method as recited in claim 22, further comprising: activating the position detector using the control device, to detect the position of the movable body part after the control device is switched back to the operating state.

24. The method as recited in claim 19, further comprising: detecting an instantaneous position of the movable body part without using a detector in that a waviness of a commutation signal activating a commutation device of the actuator is analyzed in the scope of a ripple count method by the control device to detect the position of the movable body part.

25. The method as recited in claim 19, wherein the wakeup phase of the control device includes a time span from the manual adjustment of the movable body part until a readout of a stored position from a memory.

26. The method as recited in claim 19, further comprising: performing a calibration procedure at defined points in time to calibrate a stored final position of the movable body part.

27. The method as recited in claim 26, wherein a frequency of the calibration procedures is a function of a required precision of wakeup and adjustment procedures used in the control device.

28. The method as recited in claim 19, further comprising: preventing, using an electrical system, a leakage current from causing an undesired wakeup of the control device.

29. The method as recited in claim 28, wherein the electrical system includes at least one switching system for decoupling a diagnostic branch of the actuator from an electrical ground potential in the idle state of the control device.

30. The method as recited in claim 28, wherein the electrical system includes at least one resistor network in a diagnostic branch of the actuator, the at least one resistor network dimensioned in such a way that a defined limiting value for the wakeup of the control device is not exceeded by a voltage drop caused by the leakage current.

31. The method as recited in claim 19, wherein the movable body part of the motor vehicle is one of a hatchback, a vehicle door, a convertible top, an engine hood and a fuel tank cap.

32. The method as recited in claim 19, wherein the actuator is an electric motor, which operates as a generator to generate the wakeup signal.

33. The method as recited in claim 19, wherein the position detector is one of a Hall sensor integrated into the actuator and a potentiometer operationally linked to the movable body part.

* * * * *